United States Patent [19]

Kelley

[11] Patent Number: 5,156,063
[45] Date of Patent: Oct. 20, 1992

[54] CONDUIT AND CORE ELEMENT ADJUST HAVING SLIDING COLLAR LOCK

[75] Inventor: Dixon L. Kelley, New Baltimore, Mich.

[73] Assignee: Teleflex Incorporated, Limerick, Pa.

[21] Appl. No.: 682,150

[22] Filed: Apr. 8, 1991

[51] Int. Cl.$^5$ .............................................. F16C 1/10
[52] U.S. Cl. .............................. 74/501.5 R; 74/502.4; 403/197
[58] Field of Search ...... 74/501.5, 500.5, 502.4–502.6; 188/196 B; 403/257, 197, 196, 328

[56] References Cited

U.S. PATENT DOCUMENTS

| | | | |
|---|---|---|---|
| 1,131,399 | 3/1915 | McGinley | 403/197 X |
| 3,248,882 | 5/1966 | Roosa | 74/502.4 X |
| 3,354,742 | 11/1967 | Tschanz et al. | 74/502.4 |
| 3,662,617 | 5/1972 | Bennett et al. | 74/502.6 |
| 3,665,784 | 5/1972 | Bennett | 74/502.6 |
| 3,675,898 | 7/1972 | Fattor et al. | 74/502.4 X |
| 4,304,322 | 12/1981 | Beccaris | 74/501.5 R |
| 4,338,155 | 4/1988 | Stocker | 74/500.5 X |
| 4,762,017 | 8/1988 | Jaksic | 74/500.5 X |
| 4,765,199 | 8/1988 | Andersen et al. | 74/500.5 |
| 4,787,263 | 11/1988 | Jalesic | 74/500.5 X |
| 4,899,644 | 2/1990 | Susnjara | 403/328 X |

FOREIGN PATENT DOCUMENTS

| | | | |
|---|---|---|---|
| 0299313 | 12/1989 | Japan | 74/500.5 |
| 2081411 | 2/1982 | United Kingdom | 74/502.4 |
| 0086717 | 8/1983 | United Kingdom | 74/502.4 |

Primary Examiner—David A. Scherbel
Assistant Examiner—Winnie Yip
Attorney, Agent, or Firm—Reising, Ethington, Barnard, Perry & Milton

[57] ABSTRACT

A motion transmitting remote control assembly including a conduit and a motion transmitting core element moveably supported by the conduit. A female member matingly receives a male member in one of various positions for adjustment of the relative length of one of the conduit and the core element. The female member includes a radially flexible pawl which engages the external surface of the male member to allow axial positioning of the male member relative to the female member. A collar surrounds and is slidably disposed over the female member for preventing relative movement between the male and female members.

22 Claims, 6 Drawing Sheets

CONDUIT AND CORE ELEMENT ADJUST HAVING SLIDING COLLAR LOCK

BACKGROUND OF THE INVENTION

1. Technical Field

The subject invention relates to a motion transmitting remote control assembly of the type for transmitting forces along a curved path by flexible motion transmitting core element movably supported by a flexible conduit, and more particularly to an improved assembly for adjusting the relative lengths between the core element and the conduit.

2. Background Art

Motion transmitting remote control assemblies for transmitting motion in a curved path are used in aircraft, automotive, and marine environments. Typical of the use of such remote control assemblies is the positioning of throttle control members in automobiles.

In such applications, it is frequently desirable to adjust the length or position of the of the core element once the assembly has been installed. Such assemblies normally include one or more fittings secured to the conduit for attaching the conduit to a support structure of the automobile, and the core element is adapted at one end to be attached to a member to be controlled whereas the other end is attached to a manually graspable knob for longitudinally moving the core element. After the assembly has been installed, the position of the knob must be adjusted to correspond with the position of the member to be controlled so that both the knob and member to be controlled reach their terminal end stroke positions at exactly the same time. This is accomplished by either adjusting the length of the core element or the length of the conduit, as is well known in the art.

An example of the prior art adjustment arrangement is shown in U.S. Pat. No. 3,662,617 to Bennett issued May 16, 1972, assigned to the assignee of the subject invention. This reference discloses an adjustment means attached to the conduit for adjusting the effective length of the conduit. A further example of the prior art adjustment arrangement is shown in U.S. Pat. No. 3,665,784 to Bennett issued May 30, 1972, assigned to the assignee of the subject invention. This reference discloses an adjustment means attached to the core element for adjusting the effective length of the core element. These arrangements, however, do not allow the adjustment means to be manually looked into positions after adjusting the overall length of one of the conduit and the core element to a desired length and then unlocked to readjust the length of the conduit or core element.

U.S. Pat. No. 4,765,199 to Andersen, et al, issued Aug. 23, 1988 and assigned to the assignee of the subject invention discloses a motion transmitting remote control assembly including a coupling for nonadjustably connecting a conduit to a support housing. The coupling includes a female member having a plurality of resilient fingers for engaging a male member. A locking ring is manually moved to a locked position about the female member to prevent uncoupling between the male and female members. This arrangement does not permit adjustment of the relative length of the core element or conduit.

SUMMARY OF THE INVENTION AND ADVANTAGES

According to the present invention, there is provided a motion transmitting remote control assembly of the type for transmitting forces along a curved path by a motion transmitting core element. The assembly comprises a conduit and a motion transmitting core element moveably supported by the conduit. An adjustment means adjusts the relative length of one of the conduit and the core element. The adjustment means includes a female member matingly receiving a male member in one of various positions. The female member includes a radially flexible pawl which engages the external surface of the male member to allow axial positioning of the male member relative to the female member. The invention is characterized by a collar means slidably disposed over the female member for preventing relative movement between the male and female members.

Accordingly, the collar means of the present invention in combination with the adjustment means permits the relative length of one of the conduit and the core element to be adjusted as required by the particular application and then locked in the adjusted position The adjustment means and collar means of the present invention is durable, simply designed, easy to manufacture, and easily unlocked to allow readjustment.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to FIGS. 1-7, wherein like numerals indicate like or corresponding parts throughout the several views, the preferred embodiment of a manually operated terminal adjust assembly constructed in accordance with the instant invention is generally shown at 20.

The assembly 20 includes a conduit 22 and a motion transmitting core element 24 which is movably supported by the conduit 22. The conduit 22 is preferably of the type including an inner tubular member made of an organic polymeric material and surrounded by a plurality of long lay wires disposed helically thereabout with a casing of organic polymeric material disposed about the long lay wires and the inner tubular member. The organic polymeric materials may be of the various well know plastics such as polyethylene, etc.

Figure 1:
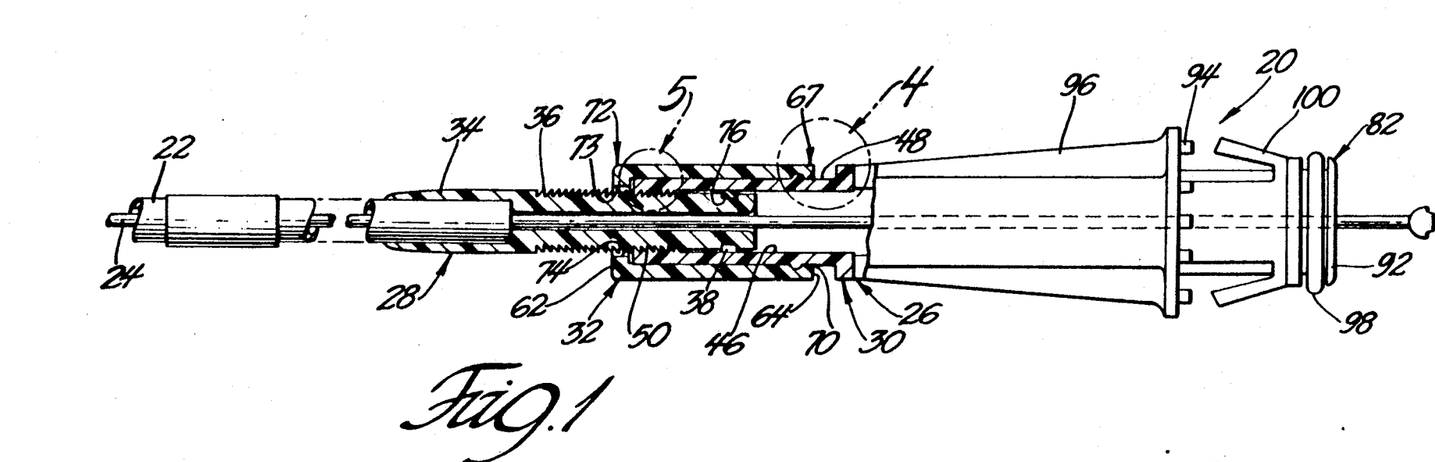
FIG. 1 is a cross-sectional view of the preferred embodiment of the assembly showing the conduit adjusted to a maximum length and the collar means disposed in the locked position.
Figure 2:
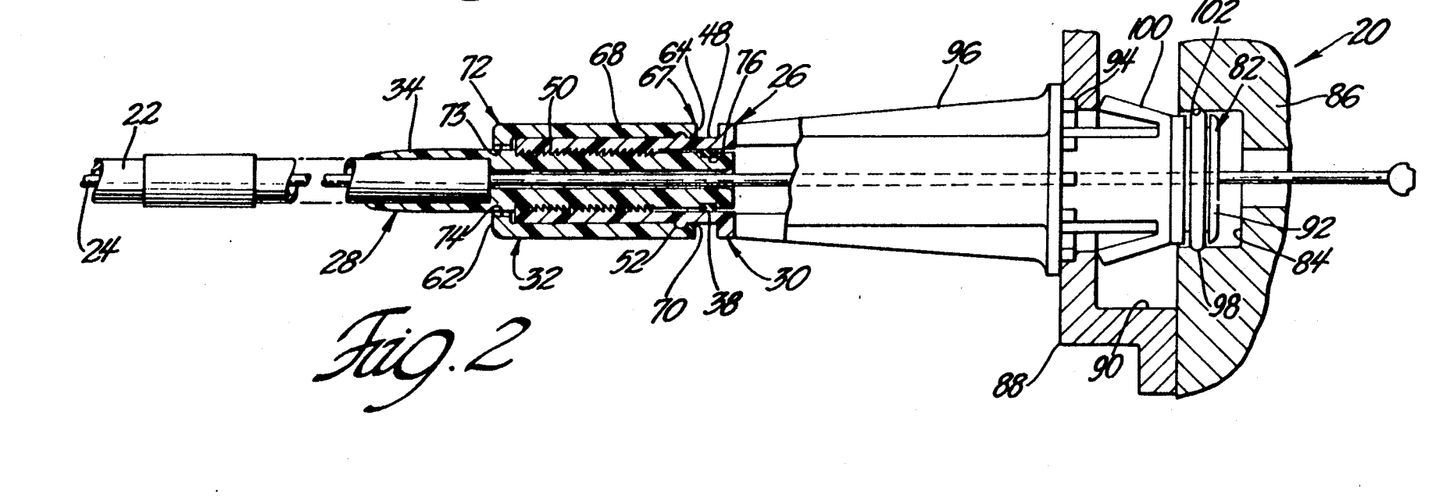
FIG. 2 is a cross-sectional view as in FIG. 1 but showing the conduit adjusted to a minimum length.

The assembly 20 includes an adjustment means, generally indicated at 26 in FIGS. 1-2, for adjusting the length of the conduit 22. In other words, the adjustment means 26 is attached to the conduit 22 for telescopic relative movement to adjust the length of the conduit 22 relative to the core element 24.

The adjustment means 26 comprises a male member, generally indicated at 28, a female member, generally indicated at 30, and a collar means, generally indicated at 32. The male member 28 is matingly received by the female member 30 at any one of various positions for length adjustment axially along the male member 28 with the collar 32 slideably disposed surrounding the female member 30 and moveable to a locked position on the female member 30 to restrain axial movement between the male member 28 and the female member 30. The male member 28, the female member 30 and the collar means 32 are preferably of organic polymeric material and may be formed using injection molding techniques.

Figure 3:
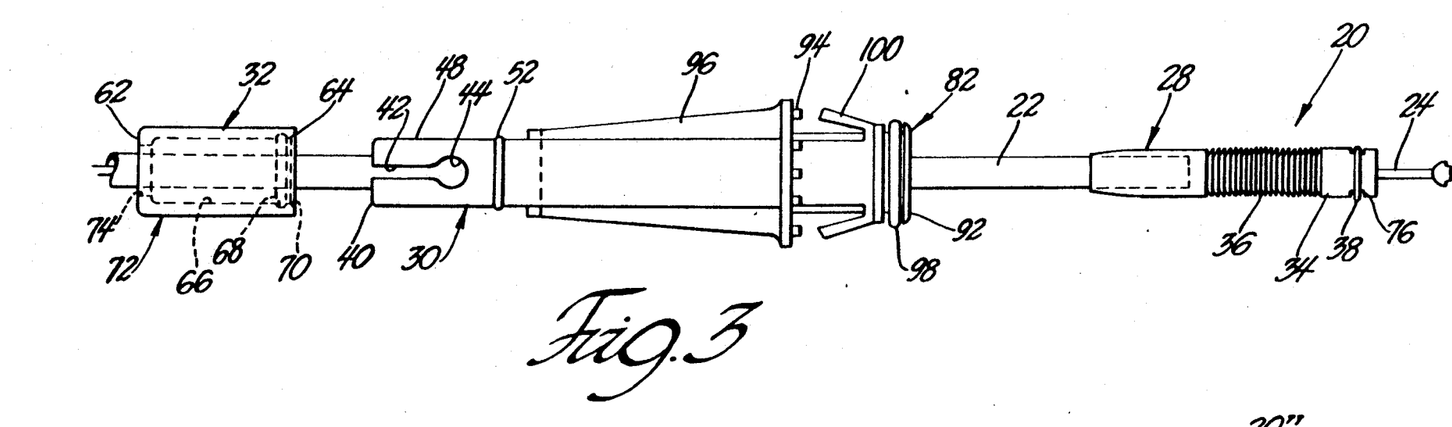
FIG. 3 is a side view of the assembly showing the male and female members of the adjustment means in an unengaged position and the collar means in an unlocked position.

The male member 28 includes an external surface 34 on which is disposed a plurality of endlessly annular external teeth 36 and a seal, preferably an O-ring 38 as shown in FIG. 3.

The female member 30 includes a plurality of radially flexible pawls 40 defined by a plurality of axially extending slots 42 as best shown in FIG. 3. The slot 42 configuration can be varied depending on the number and length of slots 42 used. For example, the slot 42 configuration shown in FIG. 3 includes two diametrically opposed slots 42 forming two pawls 40, with the slots 42 each including an enlarged rounded end 44 to reduce the stress concentrations during flexure of the pawls 40. Alternatively, an oval end (not shown) can be formed at the end of each of three or more slots to form three or more pawls 40. The female member 30 includes an internal surface 46 and an external surface 48. A plurality of arcuate internal teeth 50 are disposed on the internal surface 46 of the flexible pawls 40. An annular ridge 52 is encirclingly disposed on the external surface 48 of the female member 30.

Figure 5:
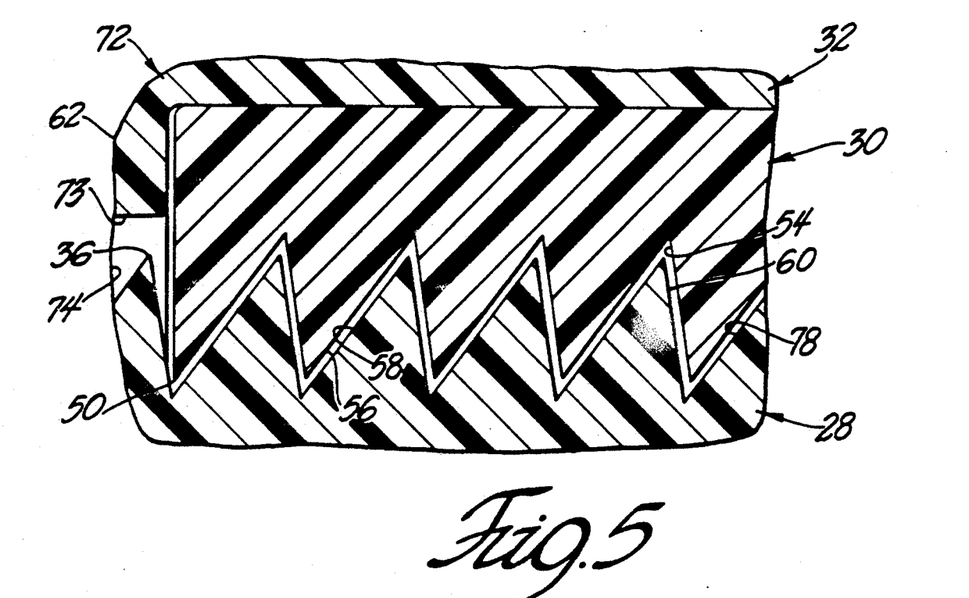
FIG. 5 is an enlarged, fragmentary cross-sectional view of the external and internal teeth of the male and female members in a no-load condition.
Figure 6:
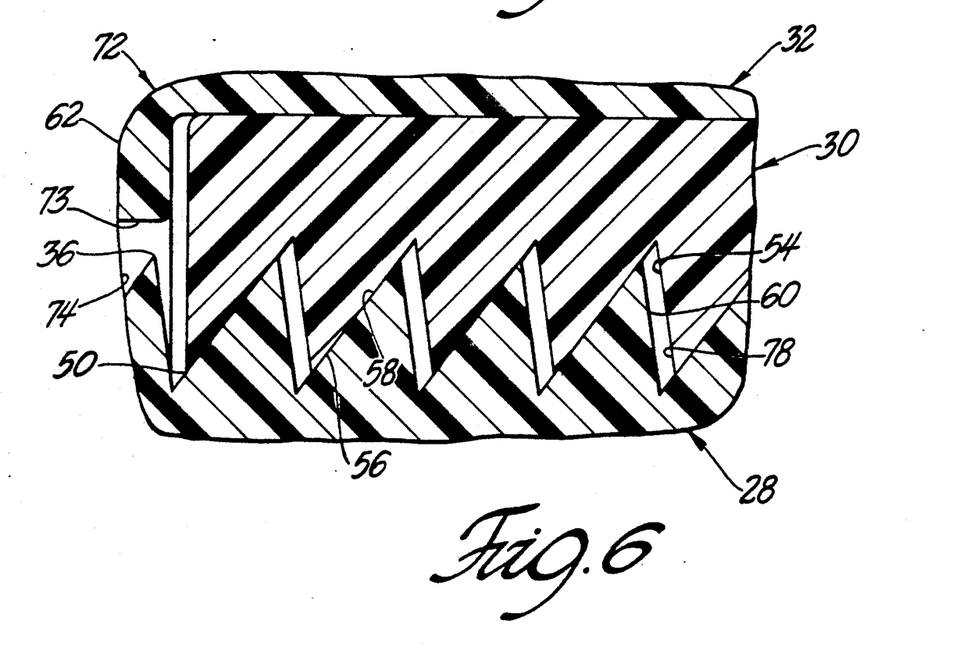
FIG. 6 is an enlarged, fragmentary cross-sectional view as in FIG. 5 showing the external and internal teeth loaded in compression.
Figure 7:
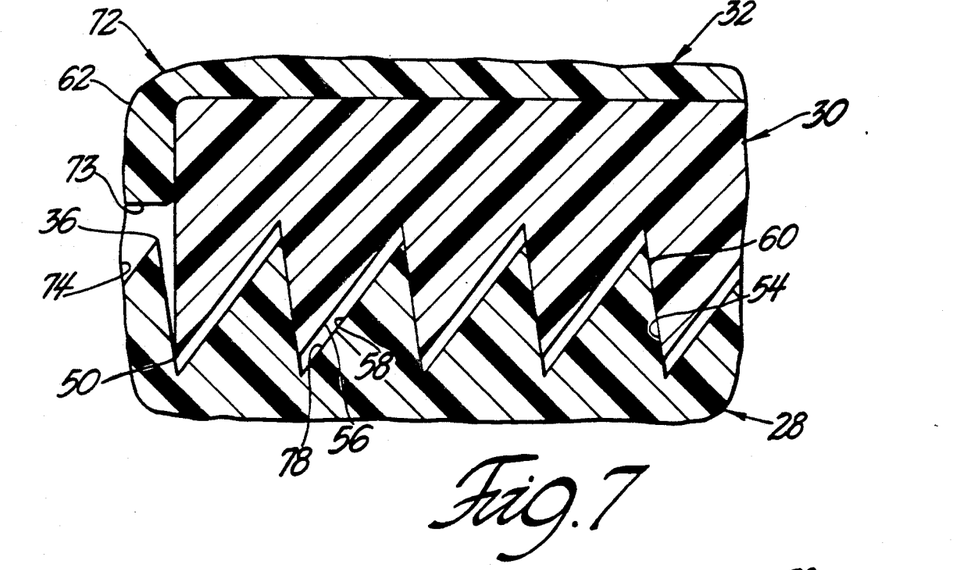
FIG. 7 is an enlarged, fragmentary cross-sectional view as in FIG. 5 showing the external and internal teeth loaded in tension.

Referring now to FIGS. 5-7 the internal teeth 50 are defined by a rearward facing inclined surface 54 and a forward facing inclined surface 56 which project from the internal surface 46 and converge at alternating crests and roots. Similarly, the external teeth 36 are defined by a rearward facing inclined surface 58 and a forward facing inclined surface 60 which extend from the external surface 34 and intersect.

Figure 4:
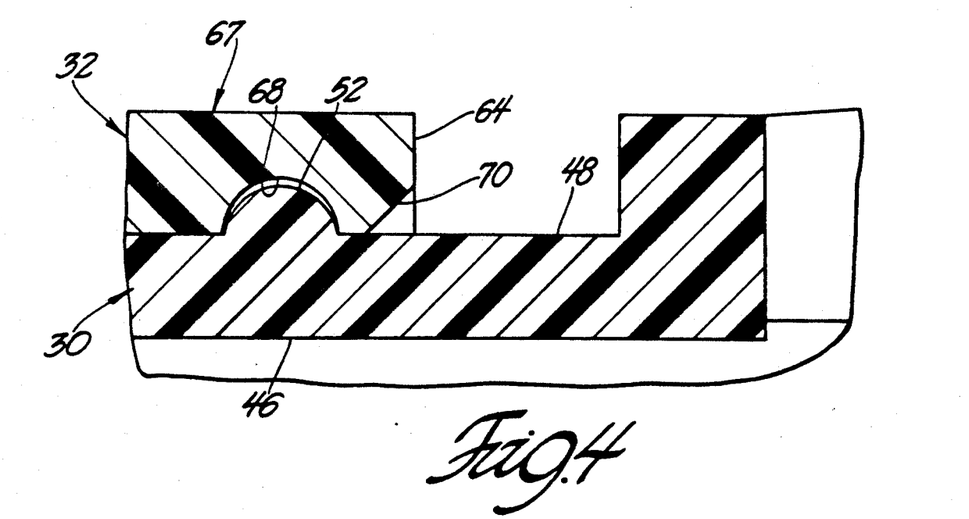
FIG. 4 is an enlarged, fragmentary cross-sectional view of the annular ridge and annular groove.

The collar means 32 has a tubular configuration which is defined by a back end 62, a front end 64, and an interior surface 66 as best shown in FIG. 3. A retaining means 67, as best shown in FIG. 4, between the female member 30 and the collar means 32 retains the collar means 32 in the locked position. The retaining means 67 includes an annular groove 68 disposed in the interior surface 66 of the collar means 32 to receive the annular ridge 52 disposed on the external surface 48 of the female member 30. The front end 64 of the collar means 32 is rounded to define a cam shoulder 70 for enabling the collar means 32 to slide over the annular ridge 52 as the collar means 32 is being moved into locking position.

A stop means, generally indicated at 72 in FIGS. 1 and 2, limits the axial movement of the collar means 32 in at least one direction relative to the female member 30, which is to the right in FIGS. 1 and 2. The stop means 72 includes an annular shoulder 73 disposed at the back end 62 of the collar means 32. The annular shoulder 73 extends inwardly toward the female member 30 forming a channel 74 through which the conduit 22 passes. When the collar means 32 is surrounding disposed on the female member 30, the annular shoulder 73 abuts against the internal teeth 50 and is prevented from continued forward movement.

An O-ring 38 is disposed between the external surface 34 of the male member 28 and the interior surface 46 of the female member 30 so as to prevent fluids from entering the adjustment means 26 and the conduit 22. The O-ring 38 is disposed in a second annular groove 76 on the external surface 34 of the male member 28.

In operation the internal teeth 50 coact with the external teeth 36 to allow axial adjustment between the female member 30 and the male member 28 in the unlocked position. The radial pawls 40 deflect outwardly during adjustment to allow the external teeth 36 to move relative to the internal teeth 50. In other words, the internal teeth 50 ratchet with the external teeth 36 to affect an adjustment of the length of the conduit 22. When the length of the conduit 22 is adjusted relative to the length of the core element 24, as for example either maximally extended as shown in FIG. 1 or maximally contracted as shown in FIG. 2, the collar means 32 is manually slid over the female member 30 to prevent further axial movement of the male member 28 relative to the female member 30 by preventing radial deflection of the pawls 40. Thus the internal teeth 50 remain engaged with the external teeth 36 thereby preventing axial movement.

The constricting force exerted by the collar means 32 on the flexible pawls 40 is such that the flexible pawls 40, and therefore the internal teeth 50, are not in direct contact with the external teeth 36 of the male member 28 and a tolerance space 78 is defined between the interacting internal 50 and external 36 teeth, as shown in FIG. 5. In a no-load condition, that is, no force being exerted on the male member 28 in either a forward or a rearward direction, the tolerance space 78 is evenly distributed between the external 36 and internal 50 teeth. In the no-load condition the male member 28 therefore rotates freely axially within the female member 30 thereby allowing the male member 28 to be self-aligning as is described in more detail below.

When a force is applied to the male member 28 in a forward direction the forward inclined surface 60 of the external teeth 36 bear on the rearward inclined surface 54 of the internal teeth 50 and displacing the tolerance space 78 thereby inhibiting rotation of the male member 28 as shown in FIG. 6. In other words the external teeth 36 and internal teeth 50 are loaded in tension.

When a force is applied to the male member 28 in a rearward direction the rearward inclined surface 58 of the external teeth 36 bear on the forward inclined surface 56 of the internal teeth 50 displacing the tolerance space 78 thereby inhibiting rotation of the male member 28 as shown in FIG. 7. In other words the external teeth 36 and internal teeth 50 are loaded in compression.

A snap-in fitting is generally indicated at 82 and is secured to the female member 30 as shown in FIG. 2. The snap-in fitting 82 is provided to support the assembly 10 in an aperture 84 in a wall 86 or the like with a spaced bracket 88 with an opening 90. The snap-in fitting 8 includes a forward end 92, a plurality of orientation ribs 94, and a pair of support ribs 96. The forward end 92 includes an O-ring 98 and a pair of flexible legs 100. The forward end 92 is passed through the opening 90 in the spaced bracket 88 and the O-ring 98 is engaged in a receiving groove 102 in the aperture 84 to seal. The flexible legs 100 are urged inward to pass through the opening 90 in the spaced bracket 88 and then extend outwardly after passing through the bracket 88 to retain the fitting 82 in the aperture 89. Access to the flexible legs 100 is thus maintained to allow for removal. The orientation ribs 94 are spaced so as to have a configuration specific to the assembly 10. The opening 90 is configured to receive only the specific orientation ribs 94 for the assembly 10 thus conferring on the snap-in fitting 82 a distinct orientation.

An opposite end (not shown) of the assembly 10 from the snap-in fitting 82, includes an end fitting (not shown) secured to a support (not shown). The end fitting is configured to have a specific orientation to be received in the support. The orientation of the snap-in fitting 82 and the end fitting are random with respect to each other. In other word, the snap-in fitting 82 and therefore the attached female member 30 are not aligned with the end fitting and, when not aligned, the conduit 22 is biased. The male member 28 is directly attached to the conduit 22. The male member 28 rotating freely axially within the female member 30 thereby allows the decrease of bias of the conduit 22. In other words the male member 28 is self-aligning.

DESCRIPTION OF ALTERNATE EMBODIMENTS

Figure 8:
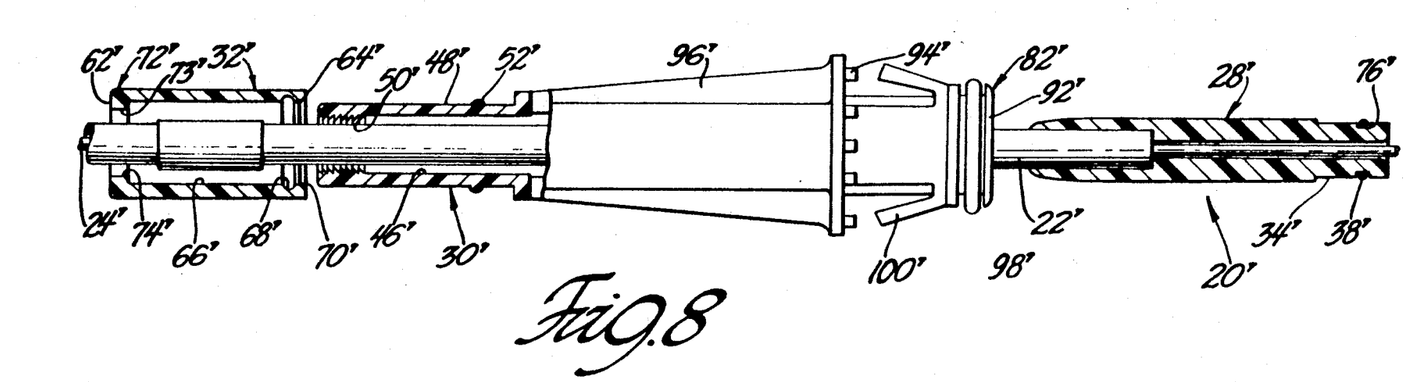
FIG. 8 is a cross-sectional view of an alternate embodiment of the assembly showing the male and female members of the adjustment means in an unengaged position and, the collar means in an unlocked position.
Figure 9:
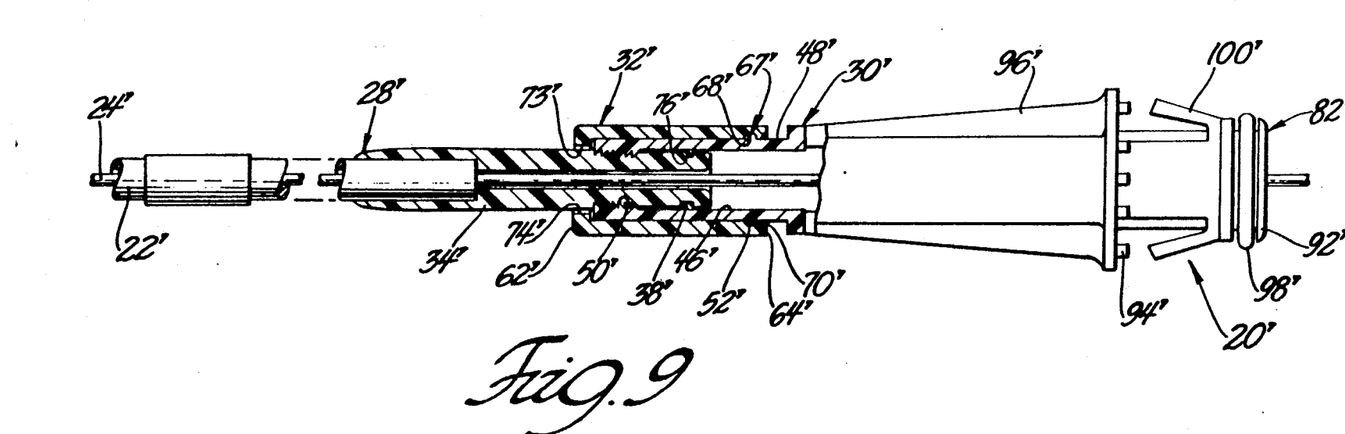
FIG. 9 is a cross-sectional view of an alternate embodiment of the assembly as in FIG. 8 showing the male and female members of the adjustment means and the collar means in an engaged position.

FIGS. 8-9 illustrate a first alternative of the subject assembly 20', with the prime designations being used to identify like or corresponding parts with the preferred embodiment of FIGS. 1-7. The assembly 20' differs from the preferred embodiment assembly 20 in that the external surface 34' of the male member 28' does not include external teeth. The male member 28' is matingly received by the female member 30' at any one of infinite positions for length adjustment axially along the male member 28'. In operation the internal teeth 46' are urged into biting contact with the smooth, untoothed external surface 34' and maintained in this position by the collar means 32'. In this embodiment the male member 28' is not free to rotate within the female member 30'.

Figure 10:
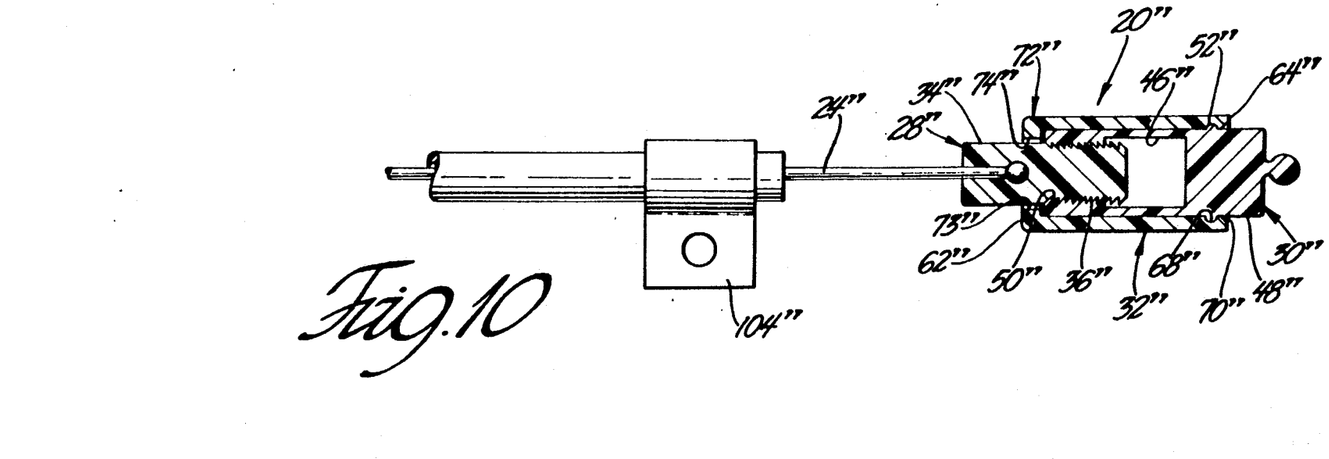
FIG. 10 is a cross-sectional view of a second alternate embodiment of the assembly in an engaged position.

FIG. 10 illustrates another alternative embodiment of the subject assembly 20", with the double prime designation being used to identify like or corresponding parts with the preferred embodiments of FIGS. 1-7. The assembly 20" illustrated in FIG. 6 differs from the preferred embodiment assembly 20 in that the adjustment means 26" is fixedly secured to and extends from the core element 24" for adjusting the length of the core element 24" relative to the conduit 22". The O-ring 38 is not required in the assembly 20". A support fitting 104" is disposed about the conduit 22" and is adapted for attachment to a support structure (not shown). In all other respects, the embodiment of assembly 20" shown in FIG. 6 is structurally similar and functions the same as the embodiment of assembly 20 shown in FIGS. 1-3.

Figure 11:
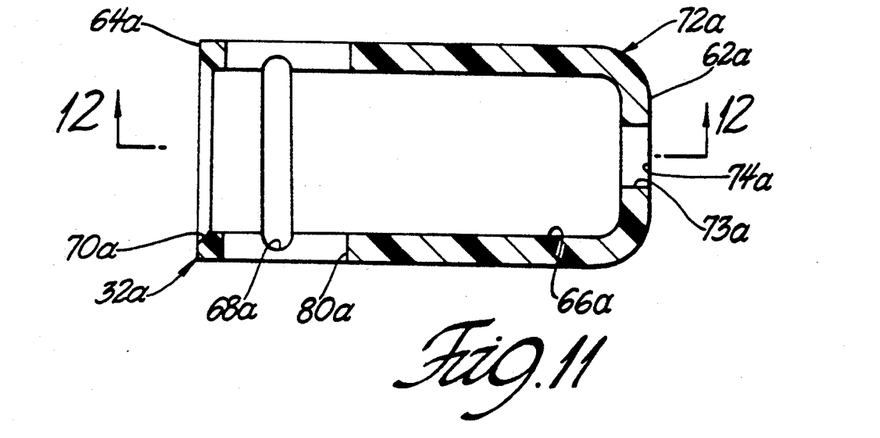
FIG. 11 is a cross-sectional view of an alternate embodiment of the collar means.
Figure 12:
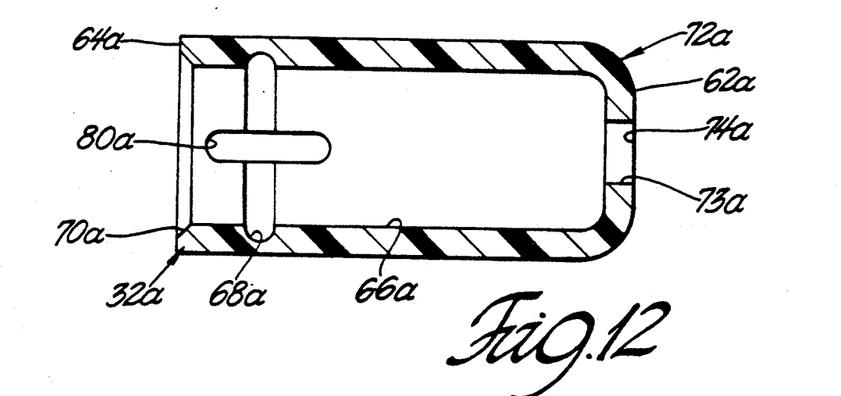
FIG. 12 is a cross-sectional view of the collar means taken along lines 12—12 of FIG. 11.

FIGS. 11-12 illustrate a first alternative of the collar means 32a, with the letter designation "a" being used to identify like or corresponding parts with the preferred embodiment of FIGS. 1-7. In order to vary the constricting force on the flexible pawls, the collar means 32a may be polymeric material with imbedded glass fibers or the like. At least one expansion slot 80a is required for the collar means 32a to allow radial flexibility as best shown in FIGS. 11-12. Expansion slot 80a is disposed adjacent to and spaced from the front end 64a of the collar means 32a.

Figure 13:
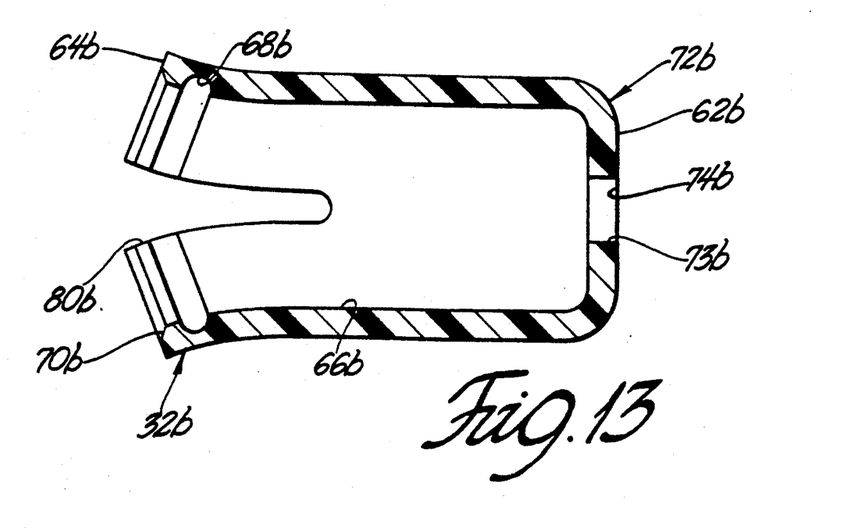
FIG. 13 is a cross-sectional view of a second alternate embodiment of the collar means showing the expansion slot hyperextended for clarity.

FIG. 13 illustrates another alternative embodiment of the collar means 32b, with the letter designation "b" being used to identify like or corresponding parts with the preferred embodiments of FIGS. 1-7. In order to vary the constricting force on the flexible pawls, the collar means 32b may be metal. At least one expansion slot 80b is required for the collar means 32b to allow radial flexibility as shown in FIG. 13. The expansion slot 80b extends through the front end 64b of the collar means 32b.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (20,20',20") of the type for transmitting motion in a curved path, said assembly (20,20',20") comprising:

a conduit (22,22',22") having a length;

a flexible motion transmitting core element (24,24',24") having a length and moveably supported within said conduit (22,22',22");

adjustment means (26,26',26") for adjusting said length of one of said conduit (22,22',22") and said core element (24,24',24"); said adjustment means (26,26',26") including a male member (28,28',28") having an external surface (34,34',34") and a female member (30,30',30") matingly received about said external surface (34,34',34") of said male member (28,28',28"), for telescopic relative movement to effect a length adjustment of one of said conduit (22,22',22") and said core element (24,24',24"); said female member (30,30',30") including a radially flexible pawl (40,40',40") with a plurality of radially inwardly extending teeth (50,50',50") engagable with said external surface (34,34',34") of said male member (28,28',28") for retaining said male member (28,28',28") and said female member (30,30',30") in a selected telescopically adjusted position, collar means (32,32',32") being tubular and slideably disposed surrounding said female member (30,30',30") and movable to a locked position for preventing radial deflection of said pawl (40,40,40 ,40") when in said locked position to retain said pawl (40,40',40") in retaining engagement with said external surface (34,34',34") of said male member (28,28',28") thereby restraining axially telescopic movement between said male member (28,28',28") and said female member (30,30',30"), and characterized by retaining means (67,67',67") between said female member (30,30',30") and said collar means (32,32',32") for retaining said collar means (32,32',32") in said locked position on said female member (30,30',30").

2. An assembly as set forth in claim 1 wherein said female member (30,30',30") has an external surface (48,48',48"), further characterized by said retaining means (67,67',67") including an annular ridge (52,52',52") disposed on said external surface (48,48',48") encircling said female member (30,30',30").

3. An assembly as set forth in claim 2 further characterized by said retaining means (67,67',67") including an annular groove (68,68',68") disposed in said tubular collar means (32,32',32") for receiving said annular ridge (52,52',52") of said female member (30,30',30").

4. An assembly as set forth in claim 3 further characterized by said collar means (32,32',32") including stop means (71,71',71") for limiting axial movement of said collar means (32,32',32") in at least one direction relative to said female member (30,30',30").

5. An assembly as set forth in claim 4 wherein said collar means (32,32',32") includes a back end (62,62',62"), further characterized by said stop means (72,72',72") including an annular shoulder (73,73',73") disposed on said back end (62,62',62") of said tubular collar means (32,32',32").

6. An assembly as set forth in claim 5 wherein said collar means (32,32',32") has a front end (64,64',64"), further characterized by said collar means (32,32',32") including a rounded cam shoulder (70,70',70") disposed on said front end (64,64',64").

7. An assembly as set forth in claim 6 further characterized by said female member (30,30',30") including a plurality of slots (42,42',42") defining a corresponding plurality of said pawls (40,40',40").

8. An assembly as set forth in claim 7 wherein said female member (30,30',30") and said associated pawls (40,40',40") includes a common internal surface (46,46',46"), further characterized by each of said pawls (40,40',40") including a plurality of spaced arcuate internal teeth (50,50',50") disposed on said internal surface (46,46',46").

9. An assembly as set forth in claim 8 further characterized by said internal teeth (50,50',50") of said pawls (40,40',40") being disposed in engagement with said external surface (34,34',34") of said male member (28,28',28") to retain said male member (28,28',28") and said female member 30,30',30") in a selected telescopically adjusted position.

10. An assembly as set forth in claim 9 further characterized by said male member (28,28") being rotatably disposed within said female member (30,30") while said collar means (32,32") is disposed in said locked position.

11. An assembly as set forth in claim 10 further characterized by said male member (28,28") including a plurality of external teeth (36,36") on said external surface (34,34").

12. An assembly as set forth in claim 11 further characterized by each of said external teeth (36,36") being continuously annularly disposed about said external surface (34,34").

13. An assembly as set forth in claim 12 further characterized by said external teeth (36,36") of said male member (28,28") coacting with said internal teeth (50,50") disposed on said female member (30,30").

14. An assembly as set forth in claim 13 wherein each of said internal teeth (50,50',50") include respective forward (56,56',56") and rearward (54,54',54") inclined surfaces and each of said external teeth (36,36") include respective forward (60,60") and rearward (58,58") inclined surfaces, further characterized by said internal (50,50") and external (36,36") teeth having a tolerance space (78,78") between adjacent respective forward (56,56";60,60") and rearward (58,58";54,54") inclined surfaces in a no-load condition.

15. An assembly as set forth in claim 14 further characterized by said adjacent forward inclined surface (56,56") of said internal teeth (50,50") bearing on said rearward inclined surface (58,58") of said external teeth (36,36") in a compression load condition.

16. An assembly as set forth in claim 14 further characterized by said adjacent rearward inclined surface (54,54") of said internal teeth (50,50") bearing on said forward inclined surface (60,60") of said external teeth (36,36") in a tension load condition.

17. An assembly as set forth in claim 14 further characterized by said male member (28,28') including a seal (74,74') disposed between said external surface (34,34') and said internal surface (46,46') of said female member (30,30').

18. An assembly as set forth in claim 17 further characterized by said male member (28,28') including an annular groove (76,76') extending inwardly from said external surface (34,34') for receiving and supporting said seal (74,74').

19. An assembly as set forth in claim 18 further characterized by said collar means (32,32',32") having an expansion slot (80a) disposed adjacent and spaced from said front end (64,64',64") for allowing radial flexibility of said collar means (32,32',32").

20. An assembly as set forth in claim 19 further characterized by said collar means (32,32',32") including a plurality of said expansion slots (80a).

21. An assembly as set forth in claim 20 further characterized by said expansion slot (80b) extending through said front end (64,64',64") for allowing radial flexibility of said collar means (32,32',32").

22. An assembly as set forth in claim 21 further characterized by said collar means (32,32',32") including a plurality of said expansion slots (80b).

* * * * *